(12) United States Patent
Olden

(10) Patent No.: US 6,401,422 B1
(45) Date of Patent: Jun. 11, 2002

(54) HINGE AND HINGE JOINT FOR STRUCTURAL FRAME MEMBERS

(75) Inventor: Marc Olden, Pacific, MO (US)

(73) Assignee: Mitek Holdings, Inc., Wilmington, DE (US)

( * ) Notice: Subject to any disclaimer, the term of this patent is extended or adjusted under 35 U.S.C. 154(b) by 0 days.

(21) Appl. No.: 09/499,103

(22) Filed: Feb. 4, 2000

(51) Int. Cl.⁷ .................................................. E04B 1/32
(52) U.S. Cl. .............................. 52/645; 52/641; 52/713; 52/DIG. 6
(58) Field of Search .............................. 52/639, 640, 641, 52/645, 655.1, 713, 714, DIG. 6; 411/466, 921; 403/119, 283

(56) References Cited

U.S. PATENT DOCUMENTS

| | | | |
|---|---|---|---|
| 2,827,676 A | * 3/1958 | Sanford | 403/231 |
| 2,937,418 A | * 5/1960 | Sanford | 403/231 |
| 3,312,485 A | * 4/1967 | Koenigshof | 403/11 |
| 3,479,783 A | 11/1969 | Jureit | |
| 3,605,355 A | 9/1971 | Solesbee | |
| 3,760,550 A | 9/1973 | Mueller et al. | |
| 3,785,108 A | 1/1974 | Satchell | |
| 3,823,522 A | 7/1974 | Jureit et al. | |
| 4,295,318 A | 10/1981 | Perlman | |
| RE31,234 E | 5/1983 | Jureit et al. | |
| 4,381,635 A | 5/1983 | Solo | |
| 4,483,120 A | 11/1984 | Gottlieb | |
| 4,486,115 A | * 12/1984 | Rionda et al. | 403/283 |
| 4,538,393 A | 9/1985 | Mitchell | |
| 4,549,838 A | 10/1985 | Birckhead | |
| 5,094,059 A | 3/1992 | Ganescu | |
| 5,553,961 A | 9/1996 | Olden | |
| 5,966,892 A | * 10/1999 | Platt | 52/712 |

FOREIGN PATENT DOCUMENTS

| | | |
|---|---|---|
| GB | 1274688 | 5/1972 |
| NZ | 228653 | 4/1989 |

\* cited by examiner

*Primary Examiner*—Carl D. Friedman
*Assistant Examiner*—Jennifer I. Thissell
(74) *Attorney, Agent, or Firm*—Senniger, Powers, Leavitt & Roedel

(57) ABSTRACT

A connector is disclosed for interconnection of disconnected truss members. The connector comprises an elongate sheet metal plate including a first plate portion and a second plate portion. The first plate portion has nailing teeth adapted to be driven into a truss member for permanently attaching the first plate portion to one member. The second plate portion has nail holes formed in it for receiving nails to permanently attach the second plate portion to another of the truss members. The second truss plate portion is substantially free of nailing teeth at the peripheries of the nail holes, but has at least one nailing tooth for temporary connection of the second plate portion to the truss during transport. The truss can be collapsed and transported to the building site with the truss members disconnected. The truss can then be erected and the truss members connected by positioning the second plate over a face of the other truss member and securing the second plate to the other truss member by driving nails through the holes.

21 Claims, 5 Drawing Sheets

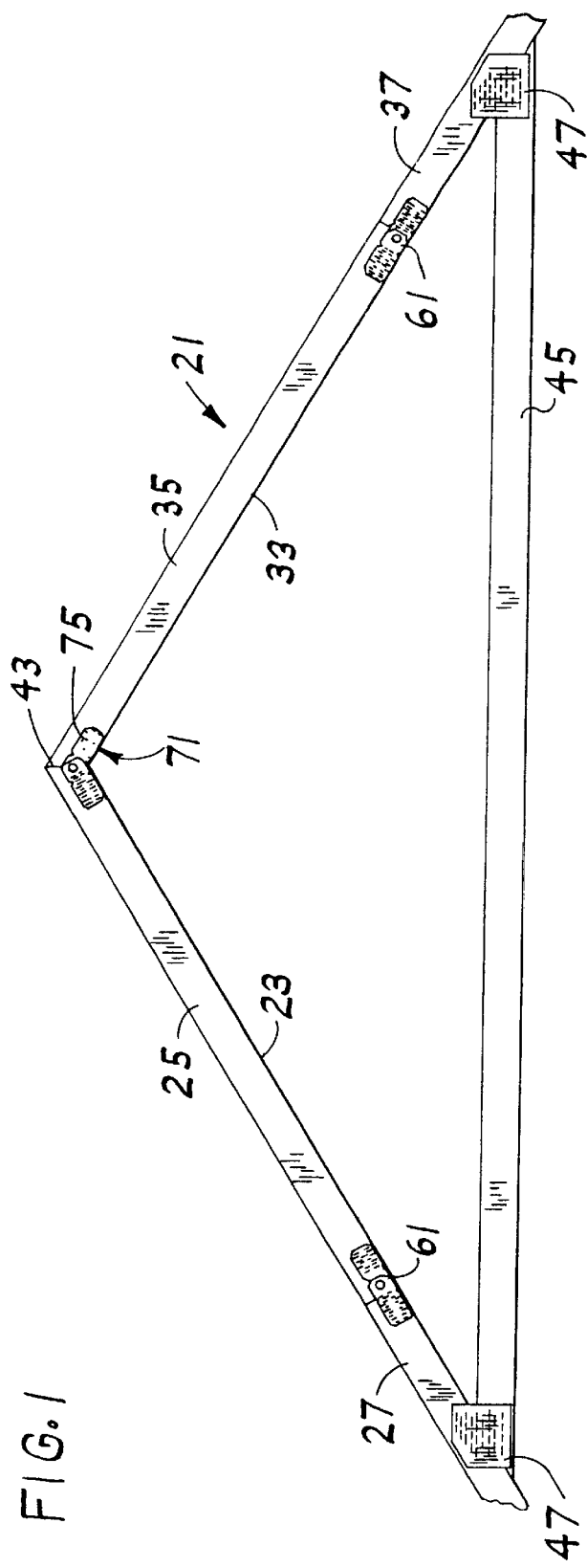
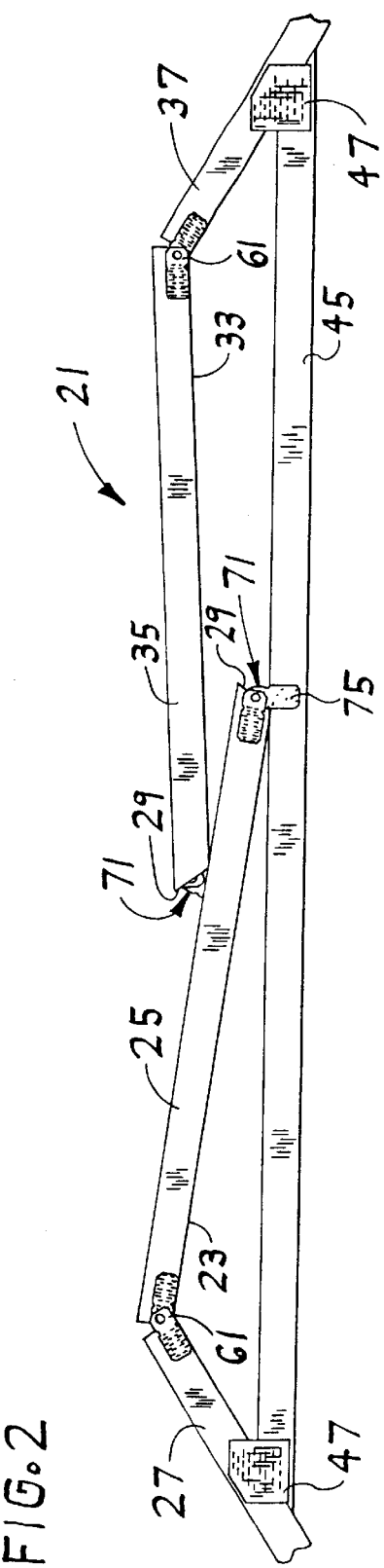

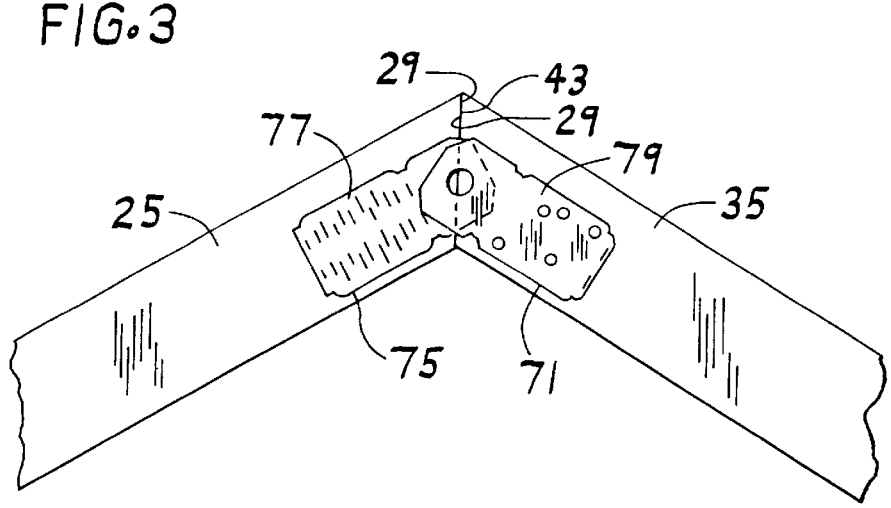
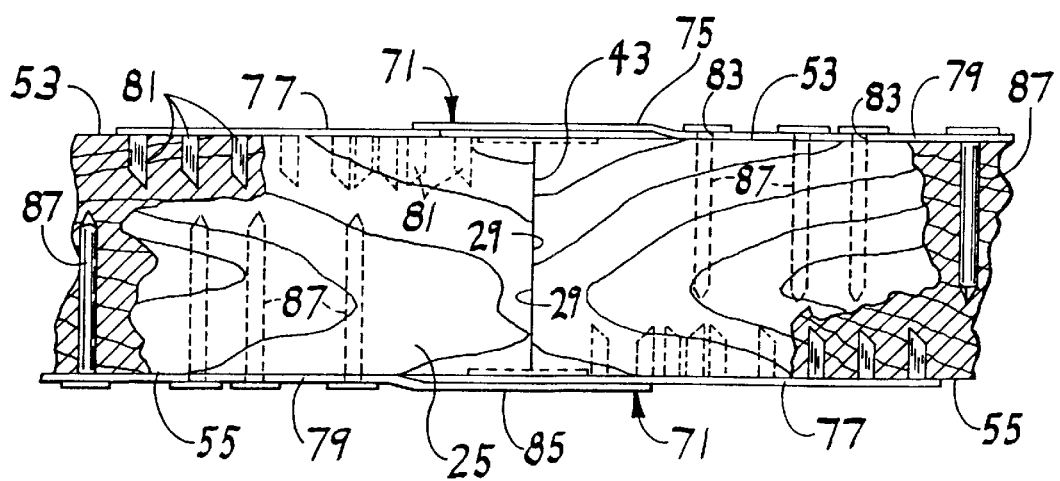

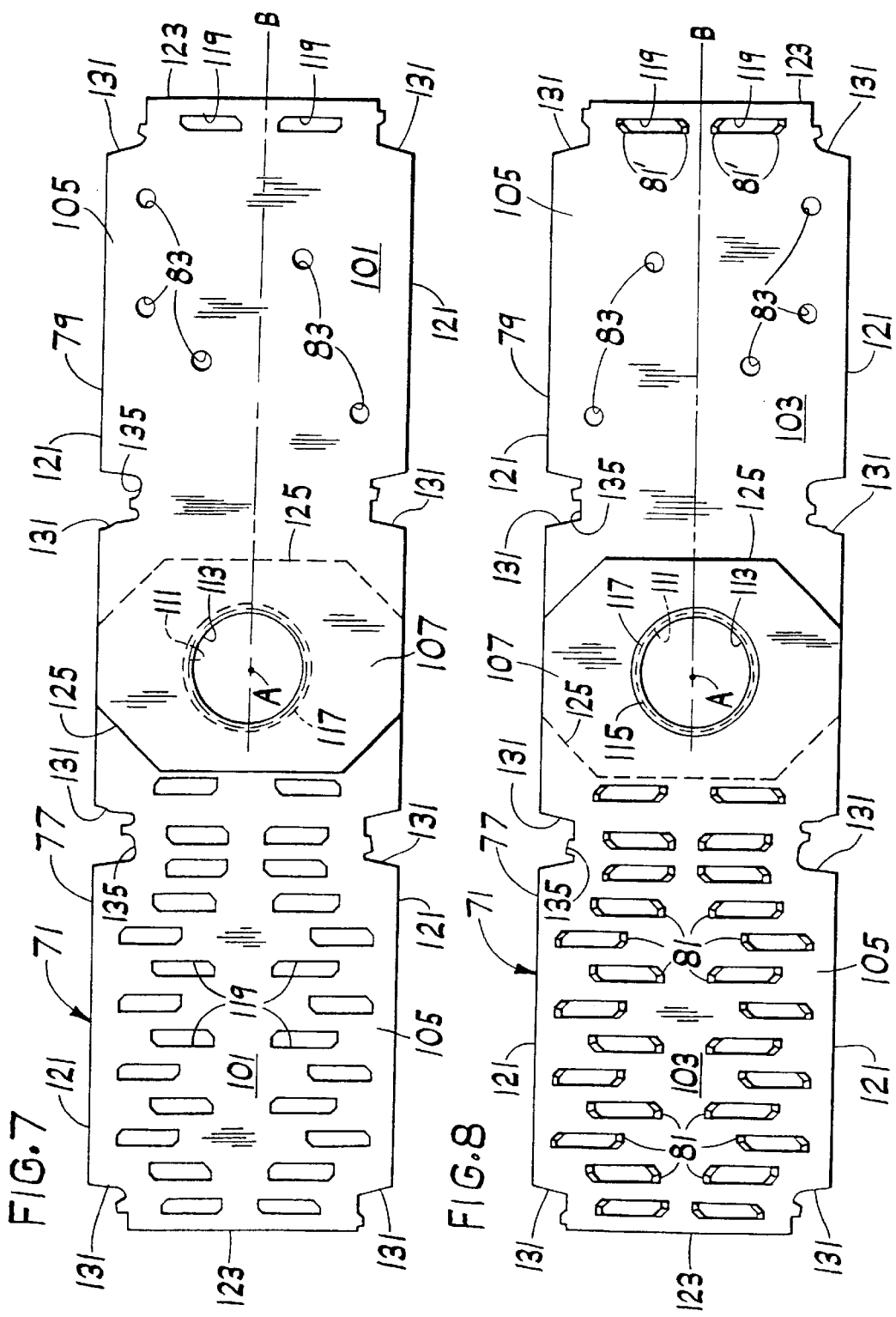

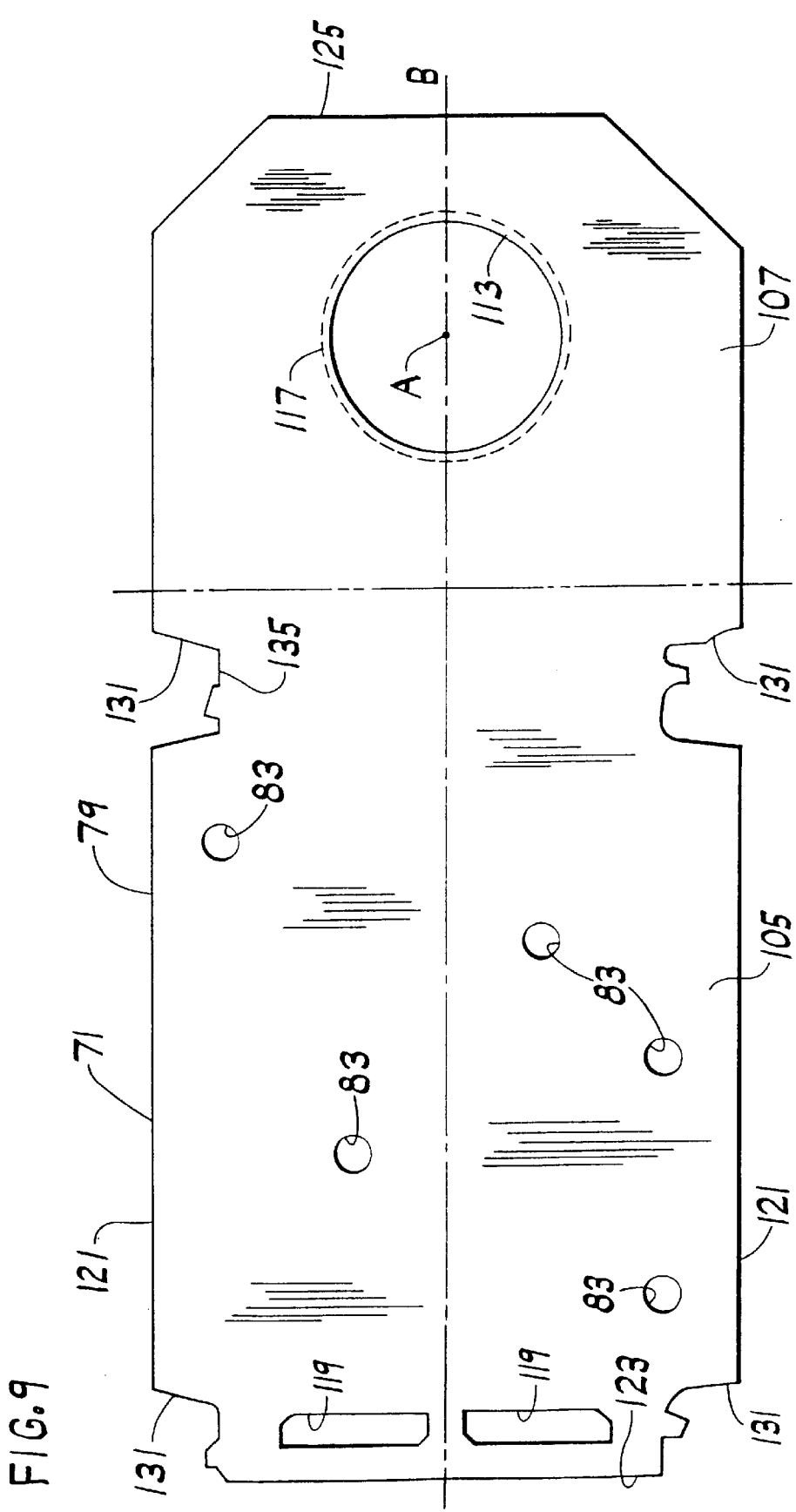

HINGE AND HINGE JOINT FOR STRUCTURAL FRAME MEMBERS

Background of the Invention

This invention relates to a hinge and a hinge joint for hingedly connecting structural frame members, more particularly to a hinge and hinge joint of a collapsible structural frame member.

The use of roof trusses manufactured in a truss plant and shipped to a building site for installation in a structure is commonplace. Because some trusses are too large for transport over public streets and highways, truss manufacturers add hinged connections within the truss so that the truss can be collapsed to a smaller (typically shorter) size for shipping. To assemble such a truss, the truss manufacturer positions truss members and nailing plates for proper engagement with one another. Integral teeth on the nailing plates, including some nailing plates having a hinge, are pressed into the truss members by a press, such as conventionally used for the driving of nailing plates to form the truss. An example of a hinged connector used in collapsible truss manufacture is shown in co-assigned U.S. Pat. No. 5,553,961, the disclosure of which is incorporated herein by reference. The manufacturers then collapse the truss structure at the hinged joints for transport to the building site.

Certain members of the truss, typically the members forming the peak of the truss, are intentionally left unconnected in the collapsed configuration of the truss. Each of the peak members is attached by a hinged nailing plate to another truss member, as is necessary to permit folding down the peak members to a collapsed position. However, the hinge of the nailing plate combined with the lack of connection of the peak members to each other allows the peak members to move during transport. Movement of the peak members during transport is undesirable and can cause damage to the truss. At the building site, the truss is erected and the peak members are connected. However, conventionally no nailing plate is used to make the connection. In any event a nailing plate would be very difficult to manually drive into the peak members so as to make an adequate connection and provision of a press at the site is impractical. Thus, the hinged connectors of U.S. Pat. No. 5,553,961 are not practical for connecting previously unconnected members at the building site. Often one or two pieces of plywood are used to connect the peak members. The plywood overlies the peak members and is separately nailed to both of them. There is no way to know whether the connection made is adequately strong. The quality of the connection will inherently be different for all peak connections.

SUMMARY OF THE INVENTION

Among the several objects and features of the present invention may be noted the provision of a connector which facilitates the use of a collapsible prefabricated frame structure; the provision of Such a connector which promotes secure interconnection of frame structure members at a construction site; the provision of a connector which permits temporary attachment of one collapsed frame structure member to another frame structure member for shipping; the provision of a connector which permits ready disengagement of a frame structure member from another frame structure member such that the frame structure member can pivot to its erect position and be permanently secured; the provision of a connector which permits permanent attachment of a first plate portion to the member during manufacture and permits permanent attachment of the second plate portion to an adjacent member at the building site; and the provision of such a connector that is economical to manufacture and easy to use.

Further among other objects and features of the present invention may be noted the provision of a joint and a truss incorporating the aforementioned connector.

Generally, a connector for interconnection of disconnected truss members comprises an elongate sheet metal plate including a first plate portion and a second plate portion. Each plate portion has one face as its outside face and another face as its inside face. The first plate portion has nailing teeth struck from the first plate portion and extending from the inside face of the first plate portion. The nailing teeth are adapted to be driven into one of the truss members for permanently attaching the first plate portion to one member. The second plate portion has nail holes formed therein for receiving nails to permanently attach the second plate portion to another of the truss members. The second truss plate portion is substantially free of nailing teeth at the peripheries of the nail holes. The truss can be collapsed and transported to the building site with the truss members disconnected. The truss can be erected and the truss members connected by positioning the second plate portion over a face of the other truss member and securing it to the other truss member by driving nails through the holes in the second plate portion.

In another aspect of the present invention, a joint connects two coplanar structural members. Each member has first and second generally flat faces. The joint includes the structural members and two connectors as described above.

In another aspect of the present invention, a truss generally comprises interconnected truss members including first and second truss members hingedly connected to others of the truss members for pivoting movement between a collapsed position in which the truss can be transported to the building site and an exact position in which this truss is configured for installation into a structure. The truss further includes a connector adapted to interconnect the first and second truss members. The connector is as described hereinabove.

Other objects and features will be in part apparent and in part pointed out hereinafter.

BRIEF DESCRIPTION OF THE DRAWINGS

FIG. 1 is a front elevational view of a simple wooden roof truss having connectors of the present invention;

FIG. 2 is the elevational view of FIG. 1 but showing the truss in its collapsed position;

FIG. 3 is a fragmentary front elevational view of a peak of the truss;

FIG. 4 is an enlarged bottom view of the peak of FIG. 3 with portions of wooden truss members broken away to show attachment of the connectors to the members;

FIG. 7 is an elevational view of an outside face of a connector of this invention;

FIG. 8 is an elevational view of an inside face of a connector of FIG. 7; and

FIG. 9 is an enlargement of the right-hand part of FIG 7.

DETAILED DESCRIPTION OF THE PREFERRED EMBODIMENT

Figure 5:
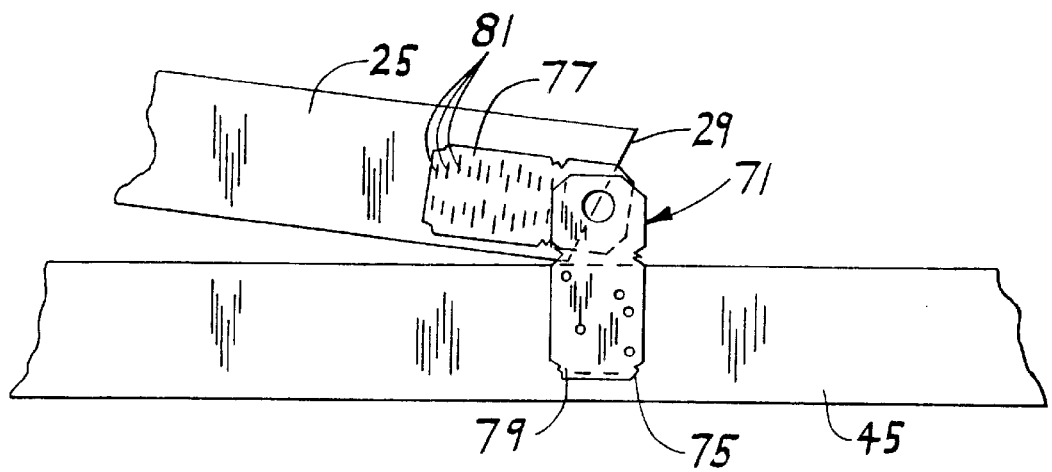
FIG. 5 is a fragmentary front elevational view of the truss of FIG. 2, showing the temporary attachment of one truss member to another.

Referring now to the drawings and specifically to FIG. 1, an erected truss constructed according to the principles of the present invention is indicated generally at 21. In a conventional roof structure (not shown), multiple, parallel wooden roof trusses provide structural support for a roof. The truss 21 shown is a simple roof truss formed of truss members (broadly "structural frame members") including a left upper chord 23 and a right upper chord 33 angled upwardly and inwardly meeting at a peak joint 43 of the roof structure. A lower chord 45 joins the lower ends of the upper chords 23, 33, completing the truss structure 21. The lower chord 45 attaches to the upper chords 23, 33 with conventional connector plates 47. The number and orientation of the truss members may vary from the preferred embodiment without departing from the scope of the invention, as the hinged connector of the present invention, generally indicated at 71, is readily applicable to alternate truss designs. For example, the truss members typically further include interior web members (not shown) extending between two of the (upper and lower) chords to strengthen the truss. In addition, the truss members may include some metal chords or webs (not shown).

For the purposes of this description, each piece of lumber incorporated as a truss member is of rectangular cross-section having two narrow sides and two wide sides. The lumber surfaces incorporating the two wide sides of the truss members will be called faces. Collectively, the members of the truss of FIG. 1 each have a first face 53 and an opposite second face 55, corresponding to the wide sides of the member.

The left upper chord 23 comprises two separate elements, an upper left element 25 and a lower left element 27. A pair of conventional hinged connector plates 61 (only one is shown) pivotally connects these elements 25,27. The hinged connector plates 61 have two plate portions pivotally connected as disclosed in co-assigned U.S. Pat. No. 5,553,961. Each plate portion has integral nailing teeth struck from it. A first connector 61 attaches to the first faces 53 of the upper left element 25 and the lower left element 27, while a second connector (not shown) attaches to the second faces 55 of the upper left element and the lower left element. Once attached, the upper left element 25 pivots freely from its erect position to a collapsed position adjacent the lower chord 45, as shown in FIG. 2. Similarly, the right upper chord 33 comprises an upper right element 35 and a lower right element 37 connected about a pair of conventional hinged connector plates 61. The upper right element 35 similarly pivots about the connector plate 61 from its erect position to a collapsed position adjacent the upper left element 25 as shown in FIG. 2.

The ends 29 of the upper left element 25 and the upper right element 35 are cut at an angle such that when the upper chords 23, 33 are in their erect position, the ends meet in generally flush engagement, transferring the load between the chords over the entire area of the peak joint 43 (FIGS. 3 and 4). A pair of connector plates 71 of the present invention join the left upper chord 23 and right upper chord 33. The connector plates 71 of the present invention are hinged like the conventional hinged connector plates 61.

The first connector plates 71 each comprises a first plate portion 77 and a second plate portion 79. The first plate portion 77 has a plurality of nailing teeth 81 for permanently mounting the connector to one of the upper chords 23, 33. The second plate portion 79 has five nail holes 83 for receiving nails 87 and permanently nailing the second plate portion to the other of the upper chords 23, 33. A first of the connector plates 71 is designated by 75 and a second of the connector plates is designated by 85. The first connector plate 75 has the teeth 81 of its first plate portion 77 pressed into a front face of the upper left chord, and the second plate portion 79 is nailed to a front face of the right upper chord 33. The second connector plate 85 attaches oppositely as compared with the first connector plate 75, with its first plate portion 77 pressed into the rear face of the right upper chord 33 and its second plate portion 79 nailed into the left upper chord 23. The nailing teeth 81 and nails 87 create a permanent angled joint 43 that fixedly holds the right and left upper chords 23, 33 in proper position, forming an erect truss 21. It is envisioned that a connector plate (not shown) could be formed with the plate portions in a fixed angular orientation (i.e.: not hinged) corresponding to the angle of the peak.

Figure 6:
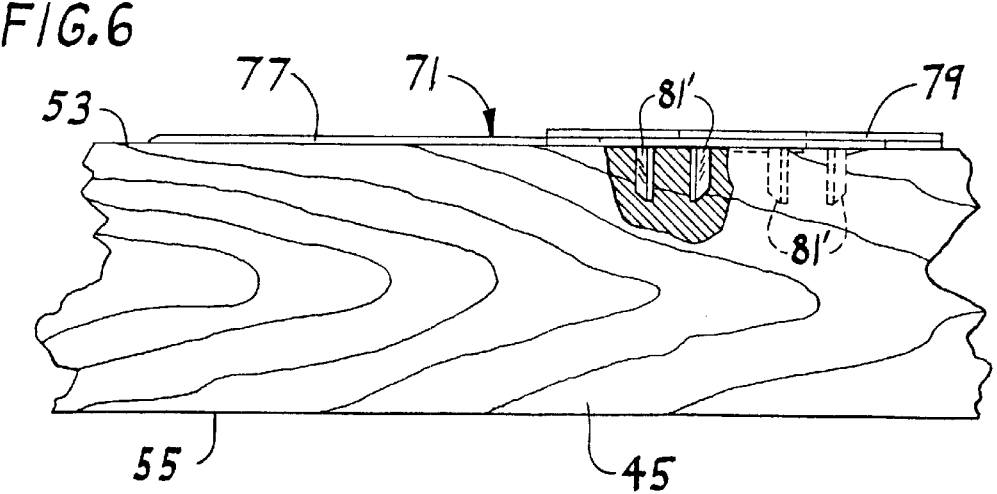
FIG. 6 is an enlarged bottom view of the truss in FIG. 5, with portions of a wooden truss member broken away to show temporary attachment of the connector to the wooden truss member.

When collapsed, the first connector plate 75 temporarily secures the collapsed upper left element 25 to the lower chord 45 by four nailing teeth 81'. In addition, the second connector plate 85 temporarily secures the collapsed upper right element 35 to the collapsed upper left element 25 by four nailing teeth 81'. These nailing teeth 81' provide adequate securement of the members for temporary connection during transport of the collapsed truss 21, while allowing ready disengagement of the members upon delivery of the collapsed truss to the building site. The nail holes 83 are not used at the truss manufacturing facility for temporary attachment of the connector plates 71 (FIGS. 5 and 6). Instead, the four nailing teeth 81' are pressed or driven into the lower chord 45, providing adequate retention for transit.

Referring to FIGS. 7 and 8, each plate portion 77, 79 has an outside face 101 and an inside face 103. The inside faces 103 of the first and second plate portions 77, 79 engage the truss members, while the outside faces 101 of the portions face outwardly from the truss members. The first and second plate portions 77, 79 each comprise a generally flat body portion 105 and a generally flat extension 107 from the body portion. The extensions 107 overlap such that the outside face 101 of the extension of the first plate portion 77 is in engagement with the inside face 103 of the extension of the second plate portion 79.

The overlapped extensions 107 are interconnected for pivotal movement of the first and second plates 77, 79 relative to the other about an axis A perpendicular to the plates. The first plate portion 77 has a circular opening 111 in its extension 107. The second plate portion 79 also has a circular opening 113 in its extension 107 and an annular flange 115 projecting outwardly from the second plate 79 around the opening. The flange 115 fits through the opening 111 in the first plate portion 77, and a rim 117 of the flange is deformed to extend radially outwardly on the inside of the extension 107 around the opening. The rim 117 locks the plate portions 77,79 together but permits the overlapped extensions 107 to pivot relative to each other about the axis A perpendicular to the plates.

The first plate portion 77 has a generally flat rectangular body portion 105 having the nailing teeth 81 struck from the portion extending from its inside face 103. The teeth 81 are struck from the body portion 105 of the plate in pairs leaving a slot 119 in the plate for each pair of teeth 81. The slots 119 extend transversely with respect to the plate 77 and the teeth 81 extend perpendicularly to the plate at the ends of the slots.

Once the teeth 81 are pressed into a wooden truss member, they are permanently affixed to the member and are not easily removed without damaging the plate 77 or the truss member. The first and second plate portions 77, 79 including the bodies 105 and the extensions 107 thereof, each are of generally rectangular form having parallel side edges 121, an outer end edge 123, and an inner edge 125. The corners of the plate at its outer end are notched as indicated at 131. Also, the plates 77, 79 have notches 131 in their side edges 121, these notches being aligned transversely of the plates and defining narrow bridges 135 of the plates between and interconnecting the main body 105 of the plate and its extension 107. The notches 131 are produced in the manufacture of plates 77, 79 from coiled sheet strip to provide for indexing forward of the strip at plate length intervals.

In the preferred embodiment, four nailing teeth 81' formed in the outer end edge 123 of the second plate portion 79 temporarily connect the connector 71 to a truss member. It is contemplated that a different location or number of teeth 81' could be used without departing from the scope of the invention, provided the second plate portion 79 is substantially free of nailing teeth at the peripheries of the nail holes 83. Generally, there should be enough nailing teeth 81' for secure, temporary attachment, but not so many as to make non-destructive detachment impractical. The nail holes 83 arranged on the second plate portion 79 allow for permanent connection of truss members. In the preferred embodiment, five nail holes 83 allow attachment of the second plate portion 79 to a truss member with nails 87. Careful selection of the location and number of the holes 83 ensures the connection is sufficiently strong for permanent attachment of the second plate portion 79 to a truss member. However, the number of holes 83 could be other than five without departing from the scope of the present invention. Additionally, the nail hole pattern is asymmetric about a longitudinal axis B of the second plate portion 79, such that two connectors 71 may attach to opposite faces of a single truss member wherein the second plate portion of the first and second connector plates engage the same part of a truss member. Because the nail holes 83 are asymmetric, the nails 87 entering one face of the truss member will not interfere with nails entering the opposite face.

In view of the above, it will be seen that the several objects of the invention are achieved and other advantageous results attained.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A connector for interconnection of disconnected truss member of a truss at a building site, the connector comprising an elongate sheet metal plate including a first plate portion and a second plate portion, said first plate portion and second plate portion each having a longitudinal axis, said plate portions being sized and shaped for flatwise engagement with the truss members such that the longitudinal axis of the plate portions are at an angle to one another, each plate portion having one face constituting its outside face and another face constituting its inside face wherein said first plate portion and said second plate portion are pivotably connected about an axis perpendicular to their inside and outside faces, said first plate portion having nailing teeth struck from said first plate portion and extending from the inside face of said first plate portion, said nailing teeth being adapted to be driven into one of the truss members for permanently attaching said first plate portion to said one member, said second plate portion having nail holes formed therein for receiving nails to permanently attach said second plate portion to another of the truss members, said second truss plate portion being substantially free of nailing teeth at the peripheries of the nail holes, whereby the truss can be collapsed and transported to the building site with the truss members disconnected, and the truss can be erected and the truss members connected by positioning said second plate over a face of the other truss member and secured to the other truss member by driving nails through the holes in said second plate portion.

2. A connector as set forth in claim 1 wherein the nail holes in said second plate portion are arranged in a pattern on said second plate portion which is asymmetric about a longitudinal axis of said second plate portion.

3. A connector as set forth in claim 2 further comprising at least one nailing tooth struck from said second plate portion at a location spaced from the nail holes for temporary connection of said second plate portion to the truss.

4. A connector as set forth in claim 3 wherein said at least one nailing tooth in said second plate portion is located at an end margin of the second plate portion opposite said first plate portion.

5. A connector as set forth in claim 3 wherein each of said first and second plate portions has a generally flat body portion and a generally flat extension from said body portion, the plate portions having their extensions overlapped with the outside face of the extension of said first plate portion in generally flatwise interengagement with the inside face of the extension of said second plate portion, said overlapped extensions being interconnected for pivotal movement of one of the plates relative to the other about an axis perpendicular to the plates.

6. A connector as set forth in claim 1 further comprising at least one nailing tooth struck from said second plate portion at a location spaced from the nail holes for temporary connection of said second plate portion to the truss.

7. A connector as set forth in claim 1 wherein said plate portions are arranged at an angle of less than 180 degrees.

8. A joint connecting two coplanar structural members, each member having first and second generally flat opposite faces, the joint comprising the two structural members and a pair of connectors, each connector comprising an elongate sheet metal plate including a first plate portion and a second plate portion, said first plate portion and second plate portion each having a longitudinal axis, said plate portions being sized and shaped for flatwise engagement with the truss members such that the longitudinal axis of the plate portions are at an angle to one another, each plate portion having one face constituting its outside face and another face constituting its inside face, said first plate portion having nailing teeth struck from said first plate portion and extending from the inside face of said first plate portion, said second plate portion having nail holes formed therein, said second truss plate portion being substantially free of nailing teeth at the peripheries of the nail holes, the nailing teeth of said first plate portion of one of the connectors being embedded in a first of the structural members on one of its flat faces and the nailing teeth of said first plate portion of the other of the connectors being embedded in said first structural member on the opposite face, and nails received through the nail holes of said second plate portion of said one connector attaching said second plate portion to one of the flat faces of the second of the structural members, and nails received through the nail holes of said second plate portion of said other connector attaching said second plate portion to the opposite face of the second structural member.

9. A joint as set forth in claim 8 wherein the nail holes in said second plate portion of each connector are arranged in a pattern on said second plate portion which is asymmetric about a longitudinal axis of said second plate portion.

10. A joint as set forth in claim 9 wherein each connector further comprises at least one nailing tooth struck from said second plate portion at a location spaced from the nail holes.

11. A joint as set forth in claim 10 wherein said at least one nailing tooth in said second plate portion of each connector is located at an end margin of the second plate portion opposite said first plate portion.

12. A joint as set forth in claim 10 wherein each of said first and second plate portions of each connector has a generally flat body portion and a generally flat extension from said body portion, said plate portions having their extensions overlapped with the outside face of the extension of said first plate portion in generally flatwise interengagement with the inside face of the extension of said second plate portion, said overlapped extensions being interconnected for pivotal movement of one of the plates relative to the other about an axis perpendicular to the plates.

13. A joint as set forth in claim 8 wherein each connector further comprises at least one nailing tooth struck from said second plate portion at a location spaced from the nail holes.

14. A truss adapted to collapse for transport and to be erected at a building site, the truss comprising interconnected truss members including first and second truss members hingedly connected to other of the truss members for pivoting movement between a collapsed position in which the truss is configured compactly for transportation to the building site and an erect position in which the truss is configured for installation into a structure, and a connector adapted to interconnect the first and second truss members in said erect position of the truss, the connector comprising an elongate sheet metal plate including a first plate portion and a second plate portion, said first plate portion and second plate portion each having a longitudinal axis, said plate portions being sized and shaped for flatwise engagement with the truss members such that the longitudinal axis of the plate portions are at an angle to one another, each plate portion having one face constituting its outside face and another face constituting its inside face, said first plate portion having nailing teeth struck from said first plate portion and extending from the inside face of said first plate portion, said nailing teeth being driven into the first truss member for permanently attaching said first plate portion to the first truss member, said second plate portion having nail holes formed therein for receiving nails to permanently attach said second plate portion to the second truss member, said second truss plate portion being substantially free of nailing teeth at the peripheries of the nail holes, whereby the truss can be collapsed and transported to the building site with the first and second truss members disconnected, and the truss can be erected and the truss members connected by positioning said second plate over a face of the second truss member and secured to the second truss member by driving nails through the holes in said second plate portion and into the second truss member.

15. A truss as set forth in claim 14 wherein the connector comprises a first connector and wherein the truss further comprises a second connector comprising an elongate sheet metal plate including a first plate portion and a second plate portion, each plate portion having one face constituting its outside face and another face constituting its inside face, said first plate portion having nailing teeth struck from said first plate portion and extending from the inside face of said first plate portion, said nailing teeth of the second connector being driven into the second truss member for permanently attaching said first plate portion to the second truss member, said second plate portion of the second connector having nail holes formed therein for receiving nails to permanently attach said second plate portion to the first truss member, said second truss plate portion of the second connector being substantially free of nailing teeth at the peripheries of the nail holes.

16. A truss as set forth in claim 15 wherein the truss is in said collapsed position, and wherein said second plate portions of the first and second connectors each comprises at least one nailing tooth struck from said second plate portion at a location spaced from the nail holes, the nailing tooth of each second plate portion being removably embedded in one of the truss members other than the first and second truss members for temporary connection of said second plate portion to the truss during transport of the collapsed truss to inhibit movement of the first and second truss members during transport.

17. A truss as set forth in claim 16 wherein said at least one nailing tooth in said second plate portion of each of the first and second connectors is located at an end margin of the second plate portion opposite said first plate portion.

18. A truss as set forth in claim 15 wherein each of said first and second plate portions of each of the first and second connectors has a generally flat body portion and a generally flat extension from said body portion, the plate portions having their extensions overlapped with the outside face of the extension of said first plate portion in generally flatwise interengagement with the inside face of the extension of said second plate portion, said overlapped extensions being interconnected for pivotal movement of one of the plates relative to the other about an axis perpendicular to the plates.

19. A truss as set forth in claim 15 wherein the truss is in said erected position and wherein the truss further comprises nails driven through the nail holes of said second plate portion of the first connector into the second truss member and nails driven through the nail holes of the second plate portion of the second connector into the first truss member.

20. A truss as set forth in claim 14 wherein the first and second truss members from the peak of the truss in the erect position of the truss.

21. A connector for interconnection of disconnected truss members of a truss at a building site, the connector comprising an elongate sheet metal plate including a first plate portion and a second plate portion, said first plate portion and second plate portion being sized and shaped such that the longitudinal axis of the plate portions are at an angle to one another, each plate portion having one face constituting its outside face and another face constituting its inside face, said first plate portion having nailing teeth struck from said first plate portion and extending from the inside face of said first plate portion, said nailing teeth being adapted to be driven into one of the truss members for permanently attaching said first plate portion to said one member, said second plate portion having nail holes formed therein for receiving nails to permanently attach said second plate portion to another of the truss members, and at least one nailing tooth struck from said second plate portion at a location spaced from the nail holes for temporary connection of said second plate portion to the truss members, said second truss plate portion being substantially free of nailing teeth at the peripheries of the nail holes, whereby the truss can be collapsed and transported to the building site with the truss members disconnected, and the truss can be erected and the truss members connected by positioning said second plate over a face of the other truss member and secured to the other truss member by driving nails through the holes in said second plate portion.

* * * * *

UNITED STATES PATENT AND TRADEMARK OFFICE
CERTIFICATE OF CORRECTION

PATENT NO. : 6,401,422 B1
DATED : June 11, 2002
INVENTOR(S) : Marc Olden

It is certified that error appears in the above-identified patent and that said Letters Patent is hereby corrected as shown below:

Column 5,
Line 60, "member" should read -- members --.

Signed and Sealed this

Twenty-seventh Day of August, 2002

Attest:

JAMES E. ROGAN
Director of the United States Patent and Trademark Office

Attesting Officer